(12) United States Patent
Oishi et al.

(10) Patent No.: US 7,980,348 B2
(45) Date of Patent: Jul. 19, 2011

(54) MOTORCYCLE

(75) Inventors: Akifumi Oishi, Shizuoka (JP); Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 49 days.

(21) Appl. No.: 12/019,587

(22) Filed: Jan. 24, 2008

(65) Prior Publication Data

US 2008/0179127 A1 Jul. 31, 2008

(30) Foreign Application Priority Data

Jan. 26, 2007 (JP) ................. 2007-016493

(51) Int. Cl.
*B62K 11/00* (2006.01)
(52) U.S. Cl. .................. 180/230; 180/219; 280/291
(58) Field of Classification Search .................. 180/219, 180/230; 280/291
See application file for complete search history.

(56) References Cited

U.S. PATENT DOCUMENTS

| | | | | |
|---|---|---|---|---|
| 4,768,799 | A * | 9/1988 | Millican | 280/291 |
| 5,002,149 | A * | 3/1991 | Watanabe et al. | 180/219 |
| 7,523,800 | B2 * | 4/2009 | Shinsho et al. | 180/219 |
| 2006/0032689 | A1 * | 2/2006 | Kojima et al. | 180/219 |
| 2006/0090945 | A1 * | 5/2006 | Ishida et al. | 180/230 |
| 2006/0124372 | A1 * | 6/2006 | Ishida et al. | 180/228 |

FOREIGN PATENT DOCUMENTS

JP 2006-168468 6/2006

* cited by examiner

*Primary Examiner* — Tony H. Winner
*Assistant Examiner* — Jacob Knutson
(74) *Attorney, Agent, or Firm* — Keating & Bennett, LLP

(57) ABSTRACT

A motorcycle including a belt type continuously variable transmission (CVT) and having a reduced width. An engine unit includes an engine having a crank shaft, the belt type CVT, a clutch, an output shaft and a generator. The CVT has a primary sheave, a secondary sheave shaft and a secondary sheave. The primary sheave is on one side of the crank shaft and the clutch is on another side with respect to the secondary sheave on the secondary sheave shaft. The output shaft is on a side opposite to the clutch on the secondary sheave shaft. The generator is on the other side of the crank shaft. A center axis of rotation of the secondary sheave shaft is higher than a center axis of rotation of the crank shaft. Right and left footsteps are located behind a rear end of the rotation motor and under a lower end of the secondary sheave.

9 Claims, 5 Drawing Sheets

MOTORCYCLE

RELATED APPLICATIONS

This application claims the benefit of priority under 35 USC 119 of Japanese patent application no. 2007-016493, filed on Jan. 26, 2007, which application is hereby incorporated by reference in its entirety.

BACKGROUND OF THE INVENTION

1. Field of the Invention

The invention relates to a motorcycle having a belt type continuously variable transmission.

2. Description of Related Art

An engine unit including an engine and a belt type continuously variable transmission (CVT) is disclosed, for example, in JP-A-2006-168468.

The engine unit of JP-A-2006-168468 is wide since the belt type CVT is located on an outer side of a piston of the engine in a vehicle width direction. Thus, a footstep of the motorcycle to which the engine unit is mounted projects greatly in the vehicle width direction. Accordingly, there is a problem in that it is difficult to downsize the vehicle body in width.

SUMMARY OF THE INVENTION

In view of the above, the invention downsizes in width a vehicle body of a motorcycle to which an engine unit including a belt type CVT is mounted.

A motorcycle in accordance with the invention comprises an engine unit and right and left footsteps. The engine unit comprises an engine; a belt type CVT; a clutch; and a rotation motor. The engine includes a crank shaft. The belt type CVT includes a primary sheave, a secondary sheave shaft and a secondary sheave. The primary sheave is provided on one side of the crank shaft in a vehicle width direction. The secondary sheave shaft is provided behind the crank shaft. The secondary sheave is provided on the secondary sheave shaft. The clutch is provided on another side in the vehicle width direction with respect to the secondary sheave on the secondary sheave shaft. The rotation motor is provided on the other side of the crank shaft in the vehicle width direction.

In the motorcycle in accordance with the invention, a center axis of rotation of the secondary sheave shaft is provided at a position higher than a center axis of rotation of the crank shaft. At least a part of the right and left footsteps is located behind a rear end of the rotation motor and under a lower end of the secondary sheave.

In accordance with the invention, the width of the motorcycle is reduced.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Outline of Embodiment

Figure 1:
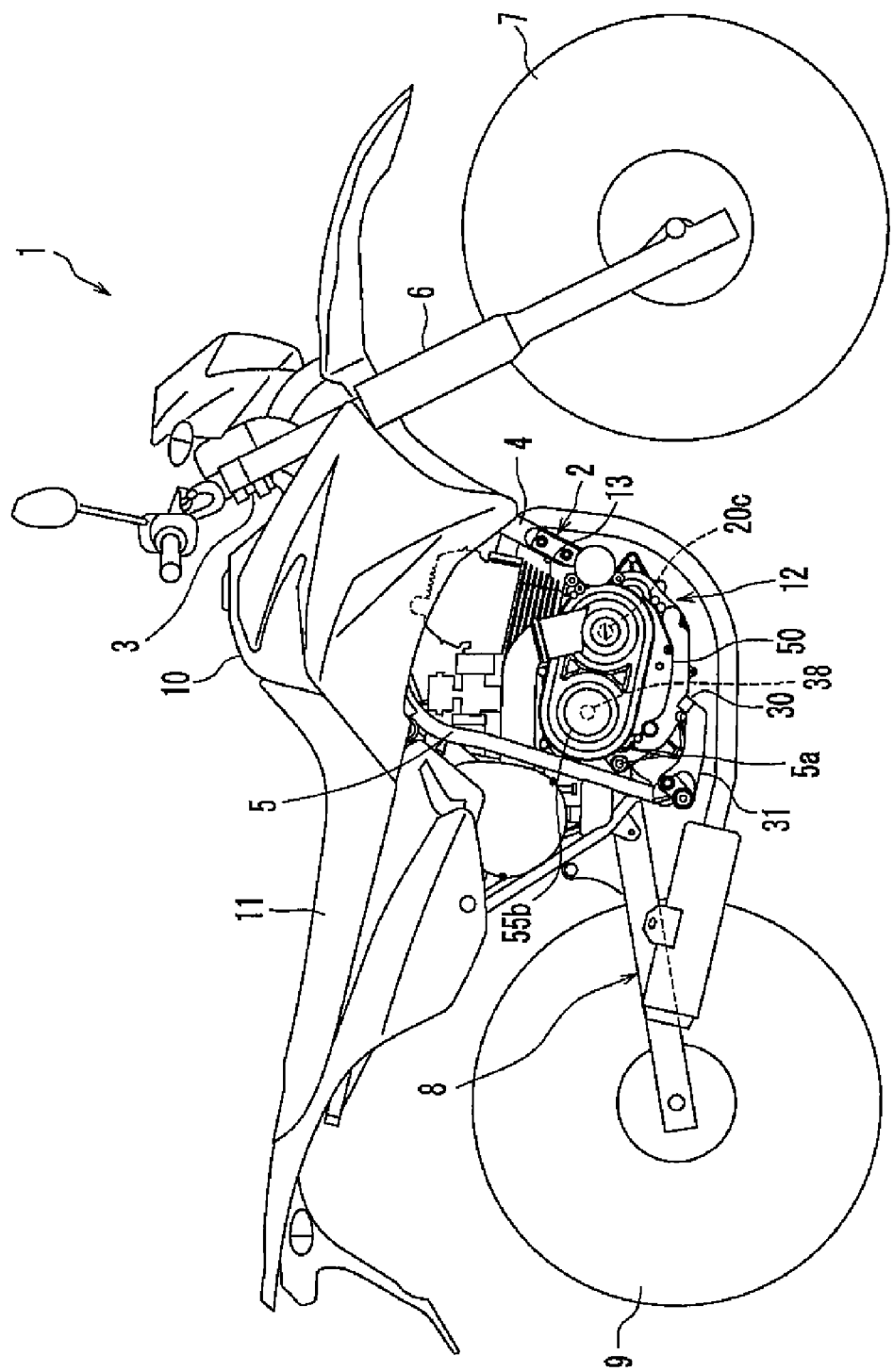
FIG. 1 is a right side view of a motorcycle according to an embodiment of the invention.
Figure 3:
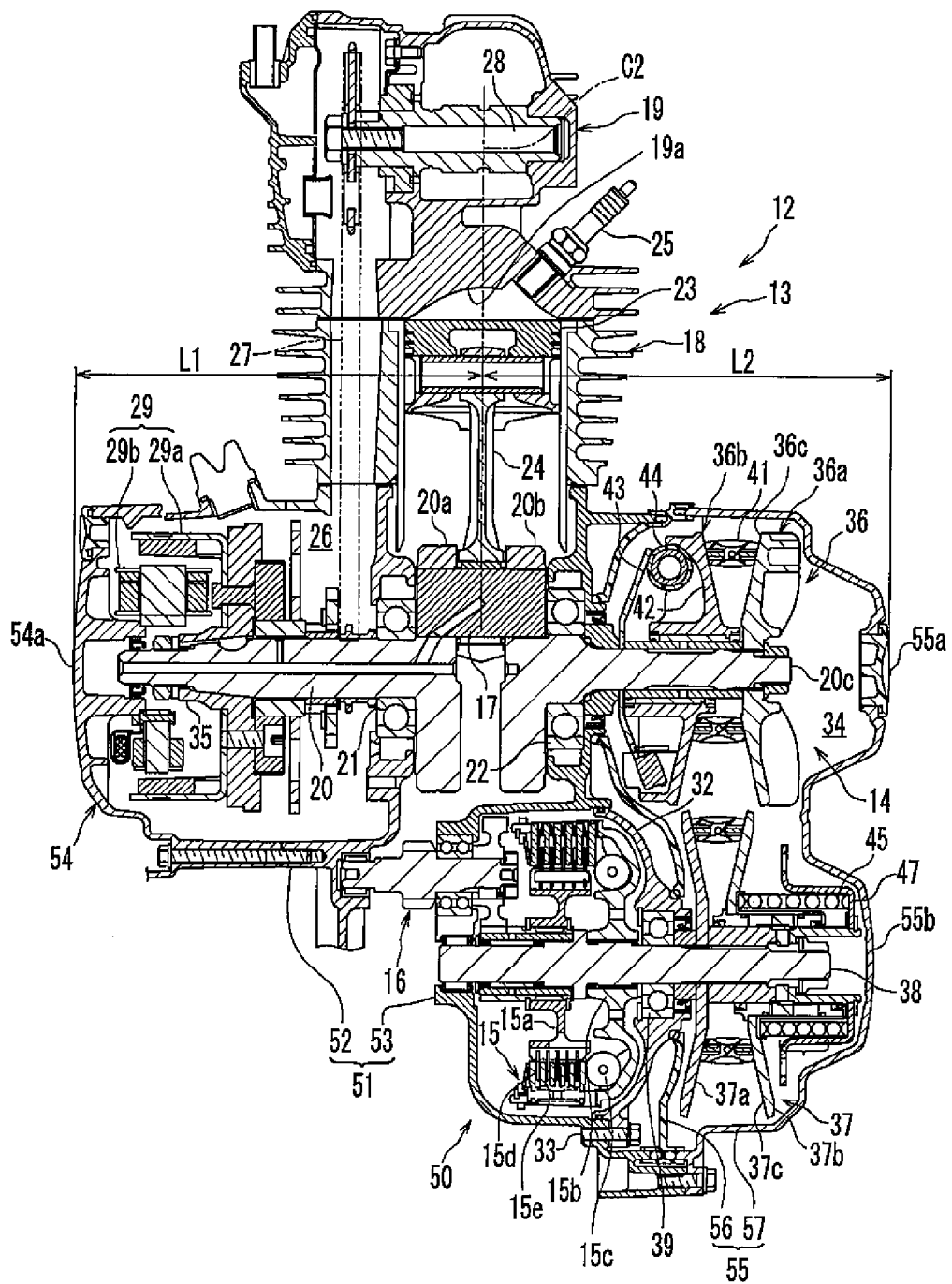
FIG. 3 is a sectional view of an engine unit of the motorcycle.
Figure 4:
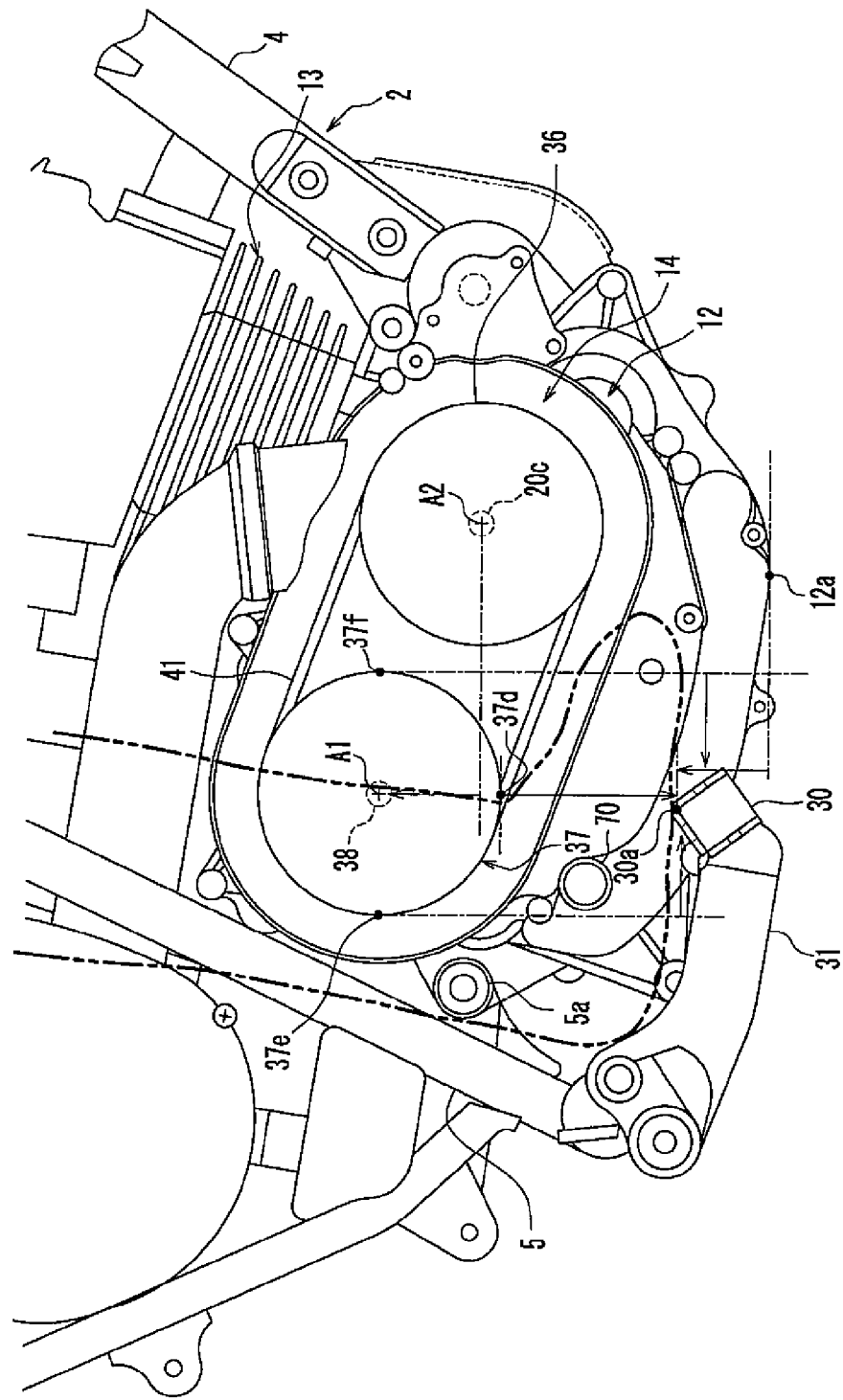
FIG. 4 is a right side view of a part of the engine unit.

An embodiment of the invention relates to an off-road type motorcycle 1 in which at least a part of a pair of right and left footsteps 30 is located behind a rear end of a generator 29 and in which an engine unit 12 including a belt type CVT 14 is mounted, as shown in FIGS. 1 and 3. A center axis of rotation A1 of a secondary sheave shaft 38 is higher than a center axis of rotation A2 of a crank shaft 20, and at least a part of footsteps 30 is located under secondary sheave 37, as shown in FIG. 4. This allows footsteps 30 to be provided further inward in the vehicle width direction and reduces vehicle width.

While motorcycle 1 is described as an off-road type, the invention is not so limited. In the invention, a motorcycle means a motorcycle in the broad sense and includes a motor scooter and a moped, for example.

<<Structure of Motorcycle 1>>

Figure 2:
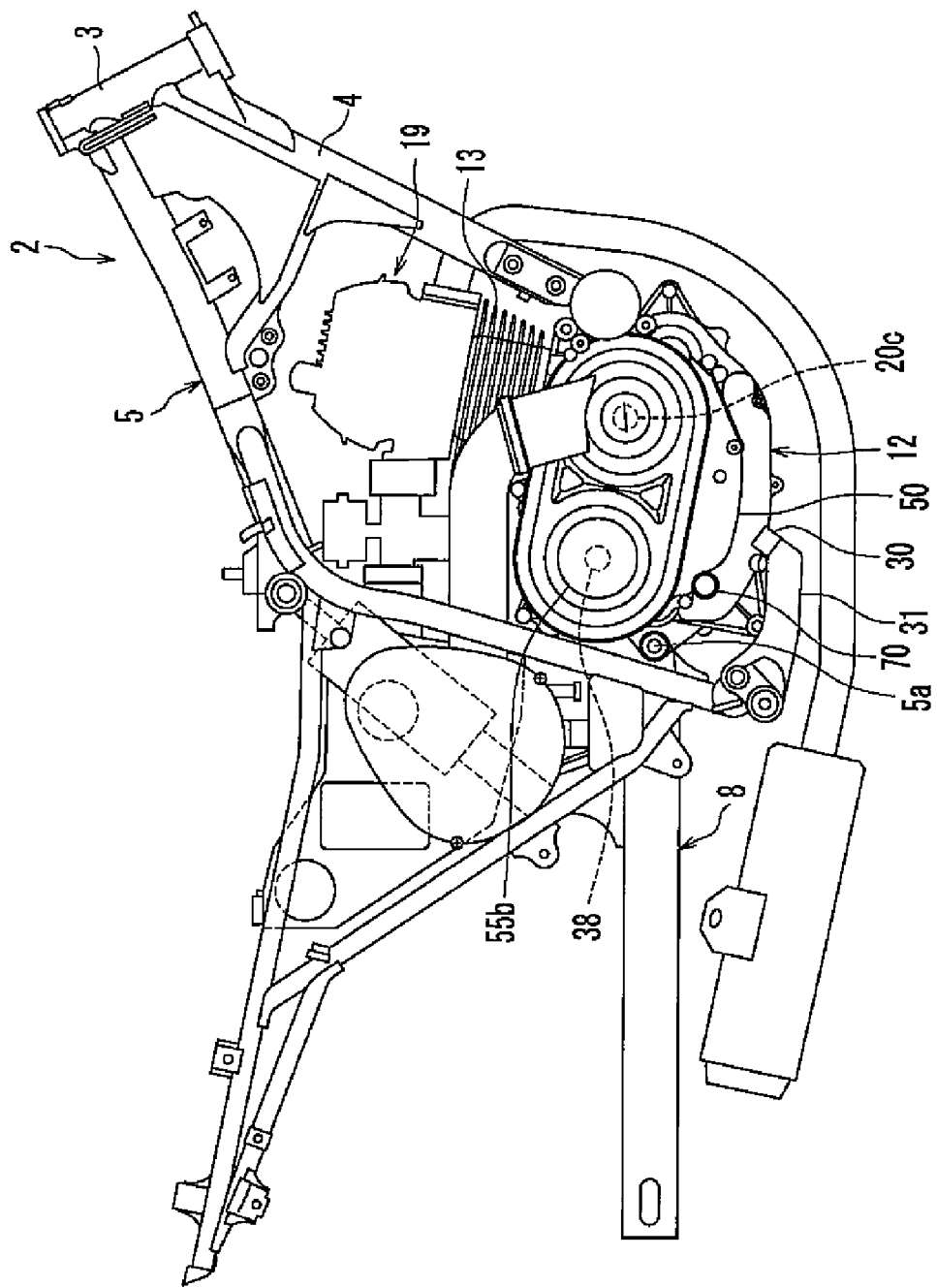
FIG. 2 is a right side view of a center portion of the motorcycle.

FIG. 1 is a side view of a motorcycle 1. FIG. 2 is a right side view of a center portion of motorcycle 1. In the following description, the back-and-forth and lateral directions are from the perspective of a driver sitting on a seat 11.

Motorcycle 1 has a body frame 2. Body frame 2 comprises a steering head pipe 3, down tube 4 and a seat pillar 5. Down tube 4 extends downward from steering head pipe 3. Seat pillar 5 extends rearward from steering head pipe 3 above down tube 4. A supporting member 31 is mounted to and extends forward from a lower end of seat pillar 5. Right and left footsteps 30, on which feet 60 of a driver are put, are mounted to a top end of supporting member 31 (refer to FIG. 5). A kick shaft 70 is provided above footstep 30, as shown in FIG. 2.

A lower end of steering head pipe 3 is connected to a front wheel 7 through a front fork 6 or the like. A rear arm 8 is pivotably supported in the vicinity of a lower end of seat pillar 5 and extends rearward. In detail, a base end of rear arm 8 is pivotably supported on a pivot shaft 5a connected to seat pillar 5. A top (rear) end of rear ram 8 is connected to a rear wheel 9. A cover 10 covers body frame 2. A seat 11 is fitted on a somewhat rear side of the center of cover 10.

Engine unit 12 is provided between and mounted to (suspended on) down tube 4 and seat pillar 5. Engine unit 12 comprises an engine 13, CVT 14, a centrifugal clutch 15, a generator 29 and a reduction mechanism 16, which are integrated into one body. Driving force generated in engine unit 12 is transmitted to rear wheel 9 through a power transmitting means such as a chain belt.

-Structure of Engine Unit 12-

Engine unit 12 is described primarily with reference to FIG. 3. As noted above, engine unit 12 comprises engine 13, belt type CVT 14, centrifugal clutch 15, reduction mechanism 16 and generator 29. For sake of convenience, reduction mechanism 16 is partially omitted from FIG. 3.

(Unit Case 50)

Engine unit 12 is housed in a unit case 50. Unit case 50 comprises a crank case 51, a generator case 54 and a transmission case 55. A crank shaft 20 is housed in crank case 51. Crank case 51 is formed from a first case block 52 and a second case block 53, which face each other in the vehicle width direction. First case block 52 is located on the left side of piston 23. Second case block 53 is located on the right side of piston 23.

Transmission case 55 is mounted on the right side of crank case 51 (concretely, second case block 53). Transmission case 55 is formed from an inner case 56 and an outer case 57. Inner case 56 is mounted on the right side of crank case 51 (concretely, second case block 53). Outer case 57 is mounted on the right side of inner case 56. A belt chamber 34 is formed by outer case 57 and inner case 56.

Generator case 54 is detachably mounted on the left side of a front half part of first case block 52. Generator case 54 divides a space to form a generator chamber for housing generator 29 together with first case block 52. Generator case 54 is provided at a position opposite to primary sheave 36 in the vehicle width direction to form an expanded part of unit case 50.

A length L1 in the vehicle width direction from a center line C2 of engine 13 extending in the back-and-forth direction to an outer end 54a of generator case 54 is longer than a length L2 from center line C2 of engine 13 to an outer end 55a of a part of transmission case 55 that houses primary sheave 36. That is, generator case 54, which forms the expanded part, expands in the vehicle width direction more than the part of transmission case 55 for housing primary sheave 36.

(Engine 13)

Engine 13 comprises crank shaft 20 extending horizontally in the vehicle width direction, a cylinder 18 and a cylinder head 19. Crank shaft 20 is housed in crank case 51 and is supported on first and second case blocks 52 and 53 through bearings 21 and 22.

Cylinder 18 is connected obliquely upward in front of crank case 51 (see also FIG. 1). Cylinder head 19 is connected to a top end of cylinder 18. Piston 23 is slidably inserted into cylinder 18. Piston 23 is connected on a crank shaft 20 side thereof to one end of a connection rod 24. The other end of connection rod 24 is connected to a crank pin 17 provided between a left crank arm 20a and a right crank arm 20b of crank shaft 20. Accordingly, piston 23 reciprocates in cylinder 18 in accordance with rotation of crank shaft 20.

A concave part 19a connected to an inner space of cylinder 18, and intake and exhaust ports that communicate to concave part 19a, are formed in cylinder head 19 An ignition plug 25 is fixedly inserted in cylinder head 19 so that an ignition part at a top end of ignition plug 25 is exposed in concave part 19a.

A cam chain chamber 26 for connecting inner parts of crank case 51 and cylinder head 19 is formed on a left side of cylinder 18. A cam chain 27 inside cam chain chamber 26 is wound around crank shaft 20 and cam shaft 28. This allows cam shaft 28 to rotate in accordance with rotation of crank shaft 20, so that an intake valve and an exhaust valve are opened and closed.

An opening formed on the right side of a rear half part of second case block 53 is closed by a clutch cover 32. Clutch cover 32 is detachably fixed to second case block 53 by a bolt 33.

(Generator 29)

A left end of crank shaft 20 passes through first case block 52 to reach the inside of generator case 54. Generator 29 is mounted to the left end of crank shaft 20 and comprises a rotor 29a and a stator 29b. Rotor 29a is formed into the shape of a cylinder. Stator 29b is provided in rotor 29a.

Stator 29b is fixed to generator case 54 so as not to rotate and not to be displaced. On the other hand, rotor 29a is fixed to a sleeve 35 rotating together with crank shaft 20. Rotor 29a thereby rotates relative to stator 29b in accordance with rotation of crank shaft 20, so that generation of electricity is carried out.

Belt type CVT 14 housed in belt chamber 34 comprises primary sheave 36 and secondary sheave 37. Secondary sheave 37 is provided behind primary sheave 36.

(Belt Type CVT 14)

Crank shaft 20 passes through second case block 53 and inner case 56 to extend to belt chamber 34. A right side part of crank shaft 20 having reached belt chamber 34 (strictly, a part on the right side of bearing 22) forms a primary sheave shaft 20c. Primary sheave 36 is mounted to primary sheave shaft 20c. Accordingly, primary sheave 36 rotates together with crank shaft 20.

Primary sheave 36 comprises a primary fixing sheave body 36a, a primary movable sheave body 36b, a roller weight 44 and a cam plate 43. Primary fixing sheave body 36a is fixed to a right top end of primary sheave shaft 20c. Primary movable sheave body 36b is mounted to primary sheave shaft 20c on the left side of primary fixing sheave body 36a. Primary movable sheave body 36b is movable in an axial direction with respect to primary sheave shaft 20c. Primary fixing sheave body 36a and primary movable sheave body 36b form a belt groove 36c with a variable width.

Cam plate 43 provided on the further left side of primary movable sheave body 36 is fixed to primary sheave shaft 20c. A space between primary movable sheave body 36b and cam plate 43 narrows toward the outer side in the diameter direction. Roller weight 44 is provided between primary movable sheave body 36b and cam plate 43. Roller weight 44 can be displaced inward or outward in the diameter direction.

A rear half of transmission case 55 is provided with a secondary sheave shaft 38 substantially parallel to primary sheave shaft 20c. Secondary sheave shaft 38 passes through inner case 56 and clutch cover 32 to extend to the inside of crank case 51. Secondary sheave shaft 38 is mounted to clutch cover 32 through a bearing 39. Secondary sheave 37 is mounted to secondary sheave shaft 38 in belt chamber 34.

Secondary sheave 37 comprises a secondary fixing sheave body 37a and a secondary movable sheave body 37b. Secondary fixing sheave body 37a is fixed to secondary sheave shaft 38 in belt chamber 34. Secondary movable sheave body 37b is mounted to secondary sheave shaft 38 on the right side of secondary fixing sheave body 37a and is movable in an axial direction with respect to secondary sheave shaft 38. Secondary fixing sheave body 37a and secondary movable sheave body 37b form a belt groove 37c with a variable width.

A spring stopper 47 is fixed to a right top end of secondary sheave shaft 38. Urging force of a compression coil spring 45 provided between spring stopper 47 and secondary movable sheave body 37b urges secondary movable sheave body 37b leftward, that is, toward secondary fixing sheave body 37a.

A V belt (a resin block V belt, for example) 41 is wound around belt groove 37c of secondary sheave 37 and belt groove 36c of primary sheave 36. Accordingly, when primary sheave 36 rotates together with crank shaft 20, torque thereof is transmitted to secondary sheave 37 through V belt 41. This results in rotation of secondary sheave shaft 38 together with secondary sheave 37.

A centrifugal clutch 15 is mounted to a part of secondary sheave shaft 38 on the left side of clutch cover 32. Centrifugal clutch 15 is connected to reduction mechanism 16 and connects and disconnects secondary sheave shaft 38 and reduction mechanism 16 in accordance with the rotation speed of secondary sheave shaft 38.

(Centrifugal Clutch 15)

Centrifugal clutch 15 comprises a clutch boss 15a connected to reduction mechanism 16, a substantially cylindrical clutch housing 15b and a roller weight 15c. Roller weight 15c is displaced inward and outward in the diameter direction. Clutch housing 15b is fixed to and rotates together with secondary sheave shaft 38. Clutch housing 15b comprises plural clutch plates 15d provided at substantially even intervals therebetween. The interval between adjacent clutch plates 15d is variable.

Clutch boss 15a is provided in clutch housing 15b and is rotatable with respect to secondary sheave shaft 38. Clutch boss 15a comprises plural friction plates 15e provided at substantially even intervals therebetween. The interval between adjacent friction plates 15e is variable.

Clutch plate 15d and friction plate 15e are separated from each other, and clutch housing 15b is thus not connected to clutch boss 15a, when secondary sheave shaft 38 is slow in rotational speed. Accordingly, torque of secondary sheave shaft 38 is not transmitted to reduction mechanism 16.

On the other hand, when the rotational speed of secondary sheave shaft 38 is fast, roller weight 15c is displaced outward in the diameter direction. This narrows a distance between adjacent friction plates 15e such that clutch plates 15d and friction plates 15e are contacted by pressure. As a result, clutch housing 15b is connected to clutch boss 15a, so that the torque of secondary sheave shaft 38 is transmitted to reduction mechanism 16.

Figure 5:
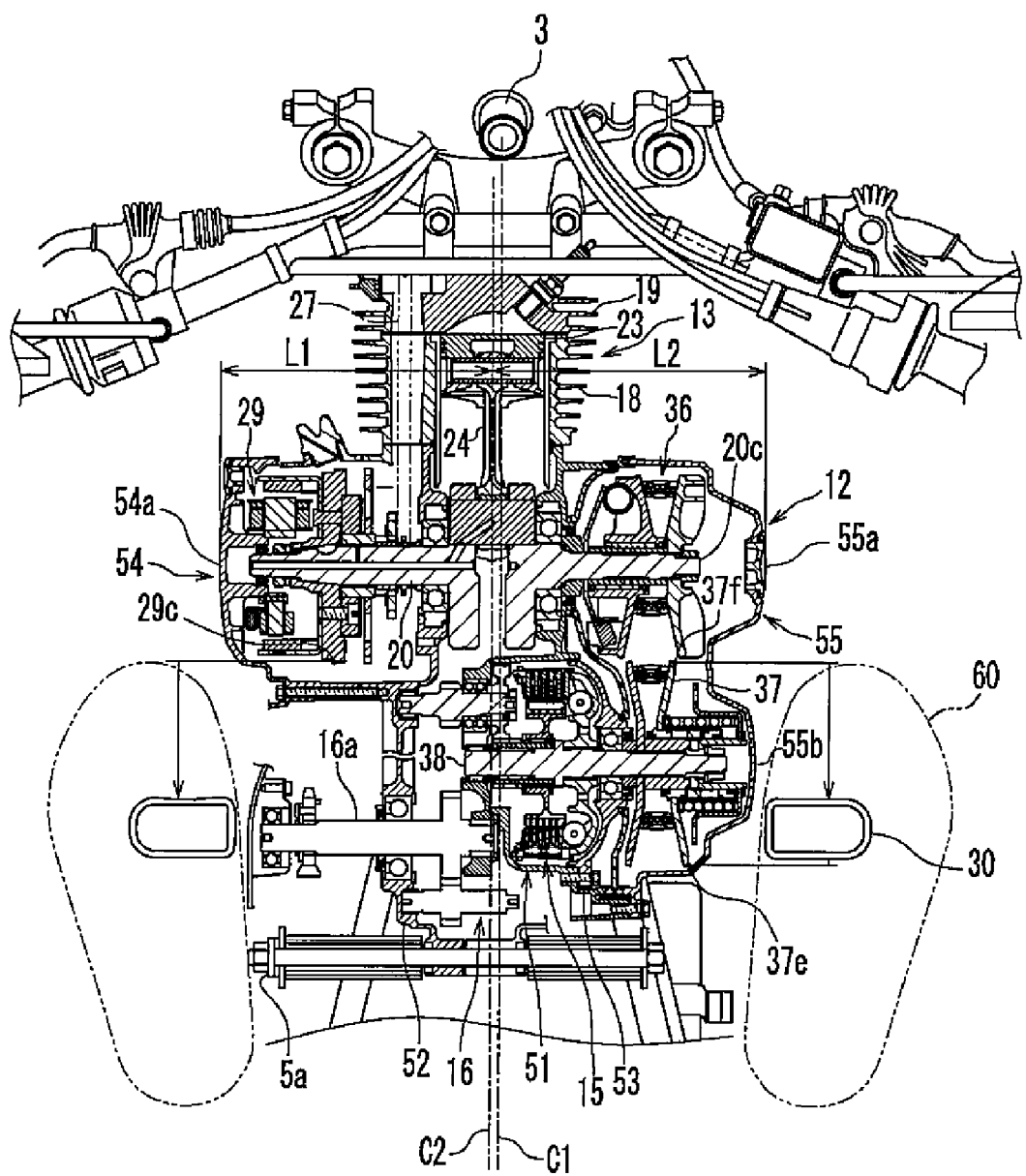
FIG. 5 is a sectional, plan view of a part of the motorcycle.

Torque transmitted to reduction mechanism 16 is output from an output shaft 16a (FIG. 5) of reduction mechanism 16 to be transmitted to rear wheel 9. Output shaft 16a is behind expanded generator case 54, as shown in FIG. 5. Output shaft 16a is provided in crank case 51. A left part of output shaft 16a passes through crank case 51 to extend outside of crank case 51. A power transmission means such as a chain is wound around the left side part of output shaft 16a.

-Arrangement of Respective Structural Members of Motorcycle 1-

The arrangement of respective structural members of motorcycle 1 is now described with reference to FIGS. 1-5.

(Arrangement of Engine Unit)

Engine unit 12 is provided so that center line C2 of piston 23 extending in the back-and-forth direction is located on the left side of a center line C1 of steering head pipe 3 in flat view, as shown in FIG. 5. In other words, center line C2 of engine 13 is located on the left side of center line C1 of body frame 2. That is, engine unit 12 is offset to the left side opposite to a side on which belt type CVT 14 is provided.

(Arrangement of Primary Sheave 36 and Secondary Sheave 37)

On the other hand, in flat view, belt type CVT 14 extends upward to the rear side, as shown in FIG. 4. The center axis of rotation A1 of secondary sheave shaft 38 is located at a position higher than the center axis of rotation A2 of crank shaft 20.

(Arrangement of Footstep 30)

As shown in FIG. 5, at least a part of footstep 30 is behind a rear end 29c of generator 29. Further, at least a part of footstep 30 is located in front of the rear end 37e of secondary sheave 37 and behind front end 37f of the same. In addition, at least a part of footstep 30 is located in a part where a left side behind generator case 54 is concave. Output shaft 16a is similarly provided in the part where a left side behind generator case 54 is concave.

As shown in FIG. 4, at least a part of footstep 30 is located under a lower end 37d of secondary sheave 37 in a perpendicular direction. An upper end 30a of footstep 30 is located above a lower end 12a of engine unit 12.

(Arrangement of Pivot Shaft 5a)

Pivot shaft 5a is provided above at least a part of footstep 30 and under the center axis of rotation A1 of secondary sheave shaft 38. Concretely, pivot shaft 5a is provided at a height substantially equal to that of the center axis of rotation A2 of crank shaft 20.

<<Operation and Effect>>

Since engine unit 12 vibrates in running of motorcycle 1, a comparatively large clearance should be provided between engine unit 12 and footstep 30 to prevent a collision between engine unit 12 and footstep 30. Accordingly, footstep 30 should be provided on a side more outer in the vehicle width direction in order to separate footstep 30 from an expanded part 55b expanding outward in the vehicle width direction (FIGS. 1 and 2) in the case that expanded part 55b overlaps footstep 30 in the vehicle width direction, for example.

In the embodiment, however, the center axis of rotation A1 of secondary sheave shaft 38 is higher than the center axis of rotation A2 of crank shaft 20 while at least a part of footstep 30 is located behind rear end 29c of generator 29 and under lower end 37d of secondary sheave 37. Accordingly, overlap in the vehicle width direction between expanded part 55b expanded outward in the vehicle width direction and footstep 30 is prevented, as shown in FIG. 4. This allows footstep 30 to be located on a side more inner in the vehicle width direction. As a result, the vehicle width of motorcycle 1 can be reduced.

Footstep 30, as a whole, is preferably arranged to be provided behind rear end 29c of generator 29 and under lower end 37d of secondary sheave 37. This allows the vehicle width of motorcycle 1 to be reduced.

The above effect is enhanced when at least a part of footstep 30 is located in front of rear end 37e of secondary sheave 37 and behind front end 37f of secondary sheave 37, as described above. The effect is further enhanced when the whole footstep 30 is provided in front of rear end 37e of secondary sheave shaft 37 and behind front end 37f of secondary sheave 37.

Moreover, as in the embodiment, the center axis of rotation A1 of secondary sheave shaft 38 may be higher than the center axis of rotation A2 of crank shaft 20, such that the rear side of engine unit 12 is higher than its front side, allowing the length of engine unit 12 in the back-and-forth direction to be reduced. This allows seat pillar 5 and pivot shaft 5a to be provided on the further front side, so that rear arm 8 can be made long. Accordingly, performance of motion of motorcycle 1 is improved.

Furthermore, pivot shaft 5a is located above at least a part of footstep 30 and under the center axis of rotation A1 of secondary sheave shaft 38 in the embodiment. Accordingly, footstep 30 is separated more from the center axis of rotation A1 of secondary sheave shaft 38. This further reduces interference of footstep 30 with engine unit 12 in the vehicle width direction. Accordingly, footstep 30 can be provided on a side more inner in the vehicle width direction. This results in effective reduction in vehicle width of motorcycle 1.

Pivot shaft 5a is preferably provided above an upper end of footstep 30 and under the center axis of rotation A1 of secondary sheave shaft 38. This allows the vehicle width of motorcycle 1 to be especially effectively reduced.

Further, providing the center axis of rotation A1 of secondary sheave shaft 38 comparatively upward prevents interference of an ankle of a foot 60, which is comparatively projecting, with expanded part 55b. Accordingly, footstep 30 can be provided in a side more inner in the vehicle width direction, so that the vehicle width of motorcycle 1 is further effectively reduced.

In addition, interference of unit case 50 with pivot shaft 5a is prevented since pivot shaft 5a is provided above at least a part of footstep 30 and under the center axis of rotation A1 of secondary sheave shaft 38. This allows pivot shaft 5a to be provided on the further front side and further improves performance of motion of motorcycle 1. Pivot shaft 5a is particularly preferably provided above the upper end of footstep 30 and under the center axis of rotation A1 of secondary sheave shaft 38.

In the embodiment, footstep 30 is provided so that upper end 30a thereof is located above lower end 12a of engine unit 12, as shown in FIG. 4. Accordingly, footstep 30 does not project downward largely from lower end 12a of engine unit 12. This allows the vehicle height of motorcycle 1 to be comparatively low.

In the embodiment, an expanded part (generator case 54 in the embodiment) is provided in the front half of unit case 50 on a side deft side) opposite to a side (right side) on which belt type CVT 14 is provided in the vehicle width direction (FIG. 5). Engine unit 12 is offset toward the left and footstep 30 is provided behind the expanded part. Accordingly, the width of motorcycle 1 is further reduced.

Providing the expanded part in the front half of unit case 50 on a side (left side) opposite to a side on which belt type CVT 14 is provided in the vehicle width direction causes a space to be made in a rear half of unit case 50 on the left side. This allows the width of the rear half of unit case 50 to be narrowed.

Both the front and rear halves of engine unit 12 on the right side, however, largely project from center line C2 of engine 13. Accordingly, footstep 30 should be provided so as to be separated from center line C1 of the vehicle body in the case that engine unit 12 is provided so that center line C2 of engine 13 would be accorded with center line C1 of the vehicle body as before. The vehicle width of motorcycle 1 thus cannot be sufficiently narrowed.

Narrowing the width of the rear half of unit case 50 on the left side and offsetting engine unit 12 leftward prevents the left and right parts of engine unit 12 from expanding. As a result, footstep 30 provided behind the expanded part can be located more closely to center line C1 of the vehicle body to prevent the width of motorcycle 1 from increasing.

Generator case 54 projecting in the vehicle width direction is provided in front of footstep 30. Further, a comparatively expanded part for housing primary sheave 36 of transmission case 55 is located in front of footstep 30. A driver, however, puts his foot 60 on footstep 30 so that a toe side would widen, as shown in FIG. 5. Accordingly, it is not a major matter to have an expanded part in front of footstep 30. Therefore, footstep 30 may be arranged so that the inner end of footstep 30 is provided on the inner side of outer end 54*a* of generator case 54 in the vehicle width direction. Footstep 30 may be arranged so that the inner end of footstep 30 is provided on the inner side of outer end 55*a* of transmission case 55 in the vehicle width direction.

That is to say, providing a comparatively large structural member in a somewhat front side part of unit case 50 and narrowing the width of a rear side on which footstep 30 is provided in the back-and-forth direction of unit case 50 as in the embodiment effectively allows footstep 30 to be provided more closely to center line C1 of the vehicle body. This results in a narrower vehicle width of motorcycle 1. Moreover, from this point of view, cam chain 27 is preferably wound on the left side of crank shaft 20.

<<Other Modifications>>

In the embodiment, generator 29 is described as provided on the left side of crank shaft 20. The invention, however, is not so limited. An electric motor may be provided instead of generator 29, for example. That is, a rotation motor functioning both as a generator and as an electric motor may be provided.

In the embodiment, footstep 30 is described as a bar-shaped body extending in the vehicle width direction. Footstep 30, however, may have other shapes such as the shape of a plate. That is, footstep 30 may be in any shape having a flat surface part on which foot 60 is put.

The invention is useful for a motorcycle, particularly, an off-road type motorcycle.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A motorcycle comprising:
   an engine unit; and
   right and left footsteps; wherein
   the engine unit comprises:
      a crank shaft;
      a belt type continuously variable transmission including a primary sheave provided on one side of the crank shaft in a vehicle width direction, a secondary sheave shaft provided behind the crank shaft and a secondary sheave provided on the secondary sheave shaft;
      a clutch provided on another side in the vehicle width direction with respect to the secondary sheave on the secondary sheave shaft; and
      a rotation motor provided on the other side of the crank shaft in the vehicle width direction; wherein
   a center axis of rotation of the secondary sheave shaft is provided at a position higher than a center axis of rotation of the crank shaft while the right and left footsteps are located behind a rear end of the rotation motor and completely below a lower end of the secondary sheave in a side view of the motorcycle; and
   each of the right and left footsteps includes a projection on which a rider's feet are placed, and the projections are located between a rear end of the secondary sheave and a front end of the secondary sheave in a vehicle longitudinal direction.

2. The motorcycle according to claim 1, further comprising:
   a body frame provided with the engine unit;
   a pivot shaft mounted to the body frame;
   a rear arm swingably mounted to the pivot shaft; and
   a rear wheel rotatably mounted to the rear arm, wherein
   the pivot shaft is provided above at least a part of right and left footsteps and under the center axis of rotation of the secondary sheave shaft.

3. The motorcycle according to claim 2, wherein
   the pivot shaft is provided at a height substantially equal to that of the center axis of rotation of the crank shaft.

4. The motorcycle according to claim 1, wherein
   an upper end of the right and left footsteps is located above a lower end of the engine unit.

5. The motorcycle according to claim 1, further comprising:
   a body frame provided with the engine unit and including a steering head pipe, wherein
   the engine unit further includes a piston between the primary sheave and the rotation motor, the piston connected to the crank shaft and extending in a back-and-forth direction in flat view, and
   a center line of the piston extending in the back-and-forth direction is located on one side of a center line of the steering head pipe, in flat view.

6. The motorcycle according to claim 5, further comprising:
   a cam chain wound around a part located on one side of a part of the crank shaft connected to the piston, in the vehicle width direction.

7. The motorcycle according to claim 1, wherein at least a part of the right and left footsteps is located in a concave part behind the rotation motor.

8. The motorcycle according to claim 1, wherein each of the projections of the right and left footsteps is a bar-shaped body.

9. The motorcycle according to claim 1, wherein each of the projections of the right and left footsteps is located directly below and spaced from the lower end of the secondary sheave.

* * * * *